Figure 1:
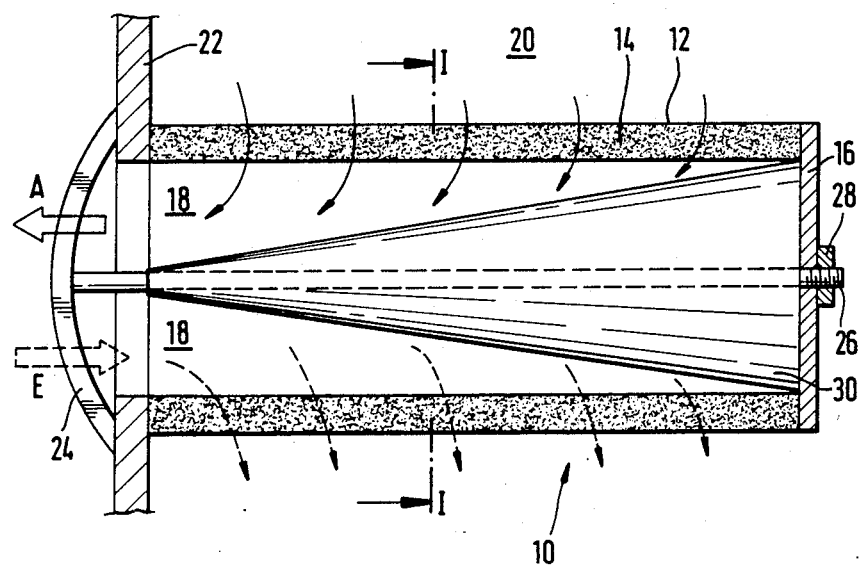

United States Patent [19]

Pötz

[11] Patent Number: 4,904,384
[45] Date of Patent: Feb. 27, 1990

[54] APPARATUS HOUSING A PLURALITY OF FILTER ELEMENTS FOR SEPARATING CONTAMINANTS FROM A FLUID

[75] Inventor: Karl Pötz, Oberursel, Fed. Rep. of Germany

[73] Assignee: Filtan Filter-Anlagenbau GmbH, Langenselbond, Fed. Rep. of Germany

[21] Appl. No.: 136,188

[22] Filed: Dec. 21, 1987

[30] Foreign Application Priority Data

Dec. 24, 1986 [DE] Fed. Rep. of Germany ....... 3644489

[51] Int. Cl.⁴ ...................... B01D 29/24; B01D 29/26
[52] U.S. Cl. .................. 210/309; 210/323.2; 210/346; 210/420; 210/456; 210/486; 210/497.3; 55/463; 55/476
[58] Field of Search .................. 55/447, 463, 476; 210/308, 309, 420, 456, 457, 497.01, 497.2, 497.3, 323.2, 346, 486

[56] References Cited

U.S. PATENT DOCUMENTS

| 3,056,499 | 10/1962 | Liddell | 210/456 |
| 3,109,809 | 11/1963 | Verrando, Jr. | 210/456 |
| 3,204,770 | 9/1965 | Brink | 210/456 |
| 3,280,981 | 10/1966 | Renfrew | 210/456 |
| 4,085,040 | 4/1978 | Egan | 210/456 |
| 4,529,518 | 7/1985 | Jackson | 210/456 |
| 4,597,870 | 7/1986 | Lambertus | 210/456 |

FOREIGN PATENT DOCUMENTS 1645749 9/1979 Fed. Rep. of Germany .
3145964 12/1983 Fed. Rep. of Germany .
3440506 10/1986 Fed. Rep. of Germany .

Primary Examiner—W. Gary Jones
Assistant Examiner—Wonda L. Millard
Attorney, Agent, or Firm—Hovey, Williams, Timmons & Collins

[57] ABSTRACT

The invention relates to an apparatus for separating contaminants comprising a tubular filter body (12) having an inner flow space (18) which is separated by a filter layer (14) from an outer flow space (20). The one end face of the filter body (12) is closed and the other end face comprises an opening. The inner flow space (18) has a substantially uniform cross-section over its entire axial length and is in flow communication on the one hand through the filter layer (14) with the outer flow space (20) and on the other hand through the end-face opening with an outside space. In the inner flow space (18) an element (30) is arranged for conducting the flow through the filter layer (14), which is characterized in that said element (30) for conducting the flow from or to the filter layer (14) is gradually tapered in its cross-section from the sealed end face (16) to the end-side opening (22) of the inner flow space (18).

9 Claims, 5 Drawing Sheets

APPARATUS HOUSING A PLURALITY OF FILTER ELEMENTS FOR SEPARATING CONTAMINANTS FROM A FLUID

DESCRIPTION

The invention relates to an apparatus for separating contaminants comprising a tubular filter body having an inner flow space which is separated by a filter layer from an outer flow space, the one end side being sealed and the other end side having an opening, and the inner flow space comprising a substantially uniform cross-section over its entire axial length and being in flow communication through the filter layer on the one hand with the outer flow space and through the end-side opening on the other hand with an outside space and the inner flow space having an element for conducting the flow through the filter layer. Furthermore, the invention relates to a flow element for the apparatus for the separation of contaminants or foreign substances and impurities.

The apparatus according to the invention covers all apparatuses which have radial inflow and several openings on their outer surface, irrespective of whether the latter are macroporous or microporous, and in which the fluid (liquids and gases) flowing through the openings is deflected into an axial direction. The same applies to apparatuses in which the fluid is deflected from an axial direction into a radial direction. The invention is preferably employed in filters.

The purpose of this apparatus is to keep constant the velocity in the interior of filter elements, in particular coalescer and quite specifically separator elements in filters or separators for separating solid (mechanical) and liquid impurities, contaminants and foreign substances from liquids and gases, in particular aircraft fuels and natural gas. Such an apparatus is described for example in DE-PS No. 3,440,506.

There is a need for apparatuses of the type mentioned at the beginning in which the axial velocity in the element interior is kept constant over the entire element length and as a result a uniform action on the filter surface is obtained in constrained manner over the entire element and thus an optimum utilization, economy and functional reliability achieved.

The aim in such filter elements is to keep the flow uniform on the entire filter surface to obtain an optimum separation degree. Said separation degree is however often very unfavourably influenced both in the flow process from the inside to the outside and in the flow process from the outside to the inside.

In simple filter elements a flow device is often dispensed with completely because by irregular soiling flow differences in the interior are necessarily equalized. In most cases with coalescer elements and also very often with separator elements flow devices are dispensed with and the result is that by irregular surface loading uncontrollable negative influences come into play which with the separator elements and also with the coalescer elements remain permanently effective because in practice often said elements become soiled only slowly or not at all.

On the other hand known flow apparatuses are only effective to a limited degree. Due to these facts known from practice the filter elements must first soil irregularly to obtain flow uniformity in the interior or alternatively elements which do not soil are not subjected to uniform flow. Thus, both these possibilities are fundamentally not acceptable.

Attempts have therefore been made to reduce these flow influences by larger inner diameters but this results in larger elements or reduces the effective zone of the elements. DE-PS No. 1,645,749 describes an apparatus in which in a hollow cylinder disposed in the element interior various irregular hole rows are provided, the size of which decreases from the closed element end face to the open element end face. However, optimum function is not possible because this construction in practice does not operate smoothly. The hole rows effect on the contrary a step-like fluid throughput. The function of the separator element is negatively influenced when the flow differs from the previously defined volume flow, which changes in practice continuously between maximum and minimum. In addition, this construction is only suitable for flow from the outside to the inside.

In a further known apparatus according to DE-OS No. 3,145,964 in the element interior of the filter a hollow cylinder is provided with various irregular hole rows, similar to the publication named above, the size of which however increases from the closed element end face to the open element end face. This construction is also intended only for flow from the outside to the inside and as regards the inner flow is completely opposite to the construction previously mentioned. However, in this case as well only a discontinuous incremental or undulating fluid throughput is obtained.

In a further known construction the entire filter element is in itself conical but this is very expensive and in addition reduces the filtering area. U.S. Pat. No. 1,304,124 further discloses an apparatus for separating water from oil in which the fluid mixture is introduced into a conically opening separating body which is divided by a plurality of diaphragms connected in series into consecutive compartments. In said compartments after the coalescing the separation of the water takes place but it is not described with which means a uniform separation of the water is to be promoted.

The invention is therefore based on the problem of further developing a device for separating contaminants comprising a flow element in such a manner that as far as possible approximately uniform throughputs per filter surface area are ensured with fluid flowing in the inner flow space.

According to the invention this problem is solved in that the inner flow space of the filter body comprises starting from the end-side opening towards the opposite end of the filter body means for constricting the inner flow space.

Said means form a flow element for conducting the flow from or to the filter layer, said element continuously tapering in its cross-section from the sealed end face to the endface opening of the inner flow space. There is thus formed between the flow element and the constant inner diameter of the inner flow space a flow surface increasing in the direction of the open end side of the filter body and as a result an approximately uniform flow rate is achieved in the interior and a uniform surface action. The fluid throughput is thus approximately identical over the entire length of the filter body or flow element, i.e. the fluid throughput in the vicinity of the end-side opening of the filter body, that is in the largest part of the inner flow space, is substantially exactly of the same magnitude as in the vicinity of the sealed end face of the filter body, i.e. in the constricted part of the inner flow space, this being due to the approximately uniform flow velocity.

In a specific embodiment the tapering generatrix of the flow element may be inwardly or outwardly arched.

The approximate uniformity of the flow velocity over the entire length of the filter body results in a uniform action on the filter surface area. This avoids any irregular soiling in the filter portion.

Moreover, the flow element may be made as independent part insertable into the filter body.

The apparatus according to the invention is equally effective both for flow from the outside to the inside and from the inside to the outside because unlike the known apparatuses it does not compensate different velocities in the tubular filter body by differently sized hole rows but the velocity is constant in the entire inner flow space due to the flow cross-section between the inner diameter of the inner flow space and the respective diameter of the flow element changing in dependence upon the volume flow.

Thus, in constrained and simple manner a constant velocity and a constant fluid throughput in the inner flow space are obtained. These are independent of the flow direction, insensitive to volume flow fluctuations which are inevitable in practical operation and can be employed for vertical and horizontal or even intermediate inclined embodiments of the filters.

Furthermore, in most cases the flow element can be installed directly in existing apparatuses, considerably increasing the volume flows because the elements can then be subjected over the entire area with the previous maximum load even at the most unfavourable point. Thus, the total volume flow of filters or separators can be substantially increased so that on retaining the previous volume flow the number of filter elements can be substantially reduced.

The flow influences when not using a flow element are all the more unacceptable the greater the flow velocity in the interior because the influence increases with the second power of the velocity. In apparatuses without flow element with flow from the outside to the inside the fluid throughput is greatest at the open end of the filter body and with flow from the inside to the outside at the closed end of the filter body.

Figure 2:
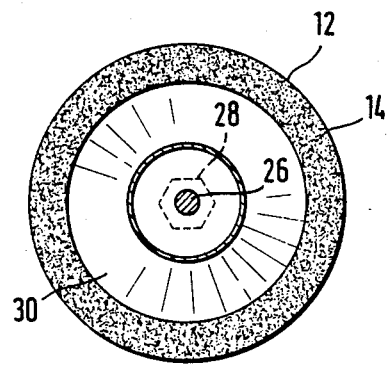
Figure 4:
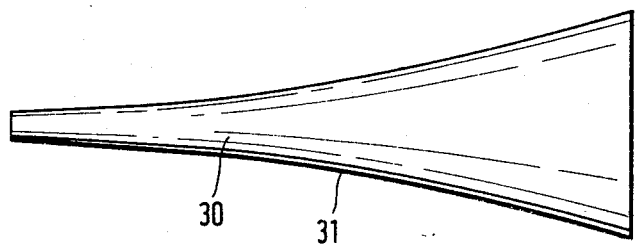
Figure 5:
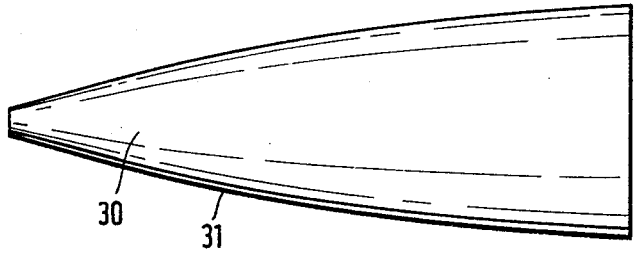
Figure 6:
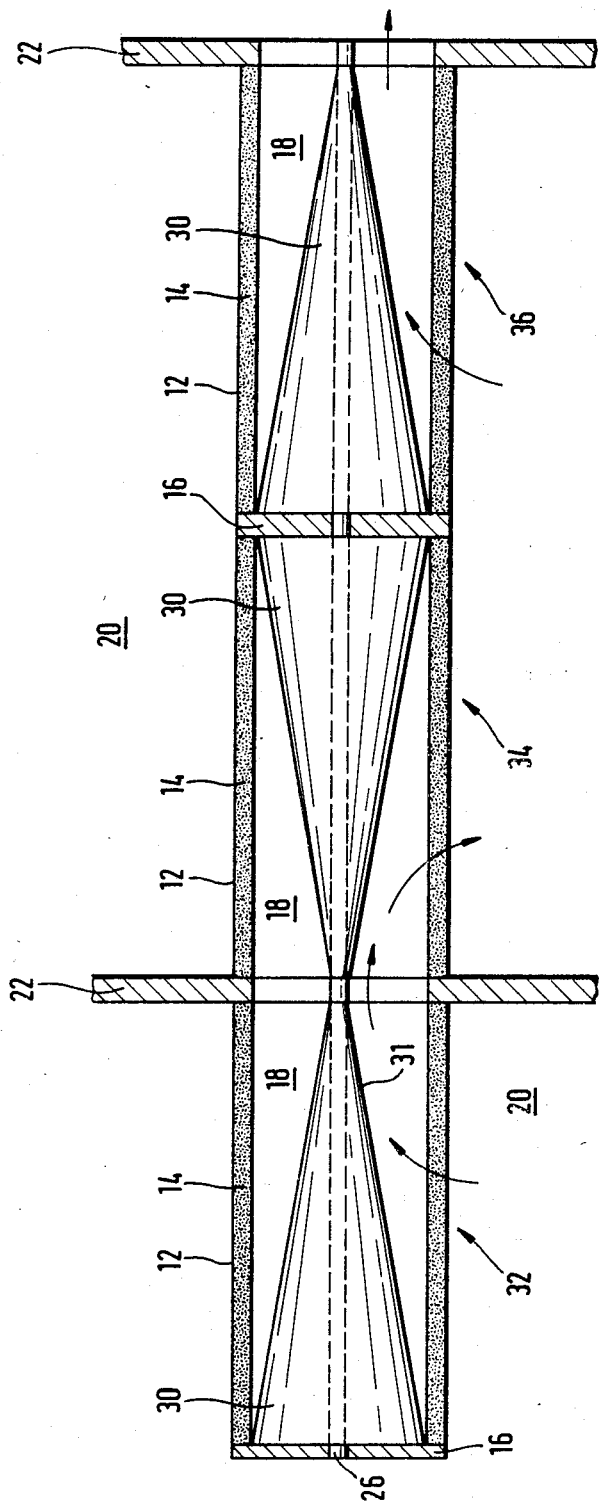
Figure 7:
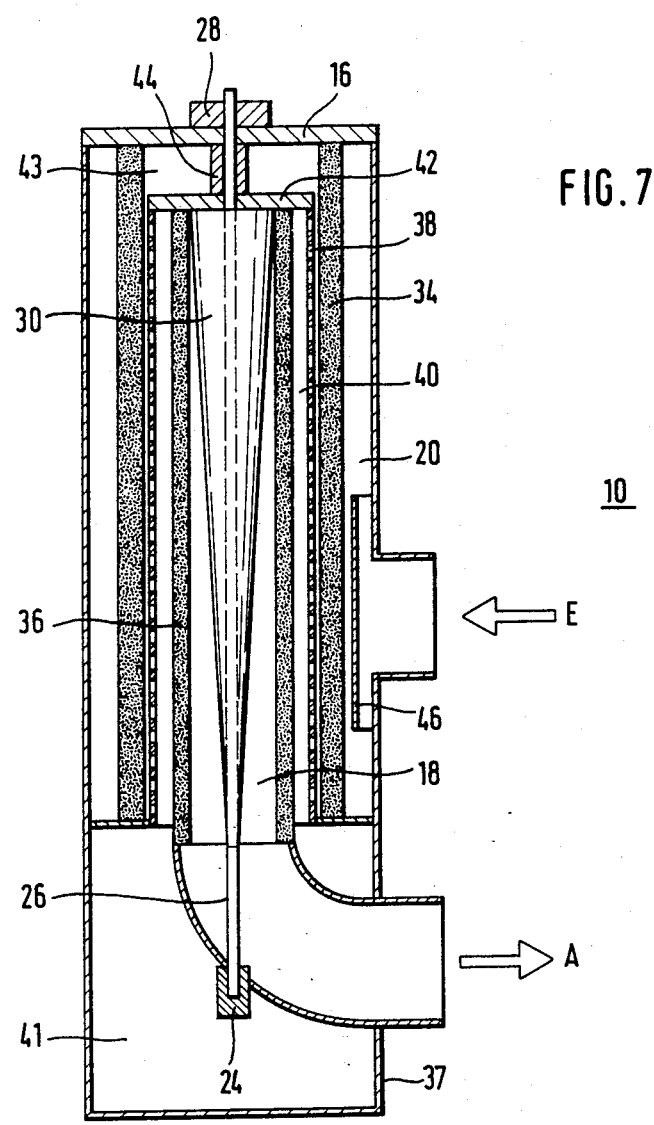
Figure 8:
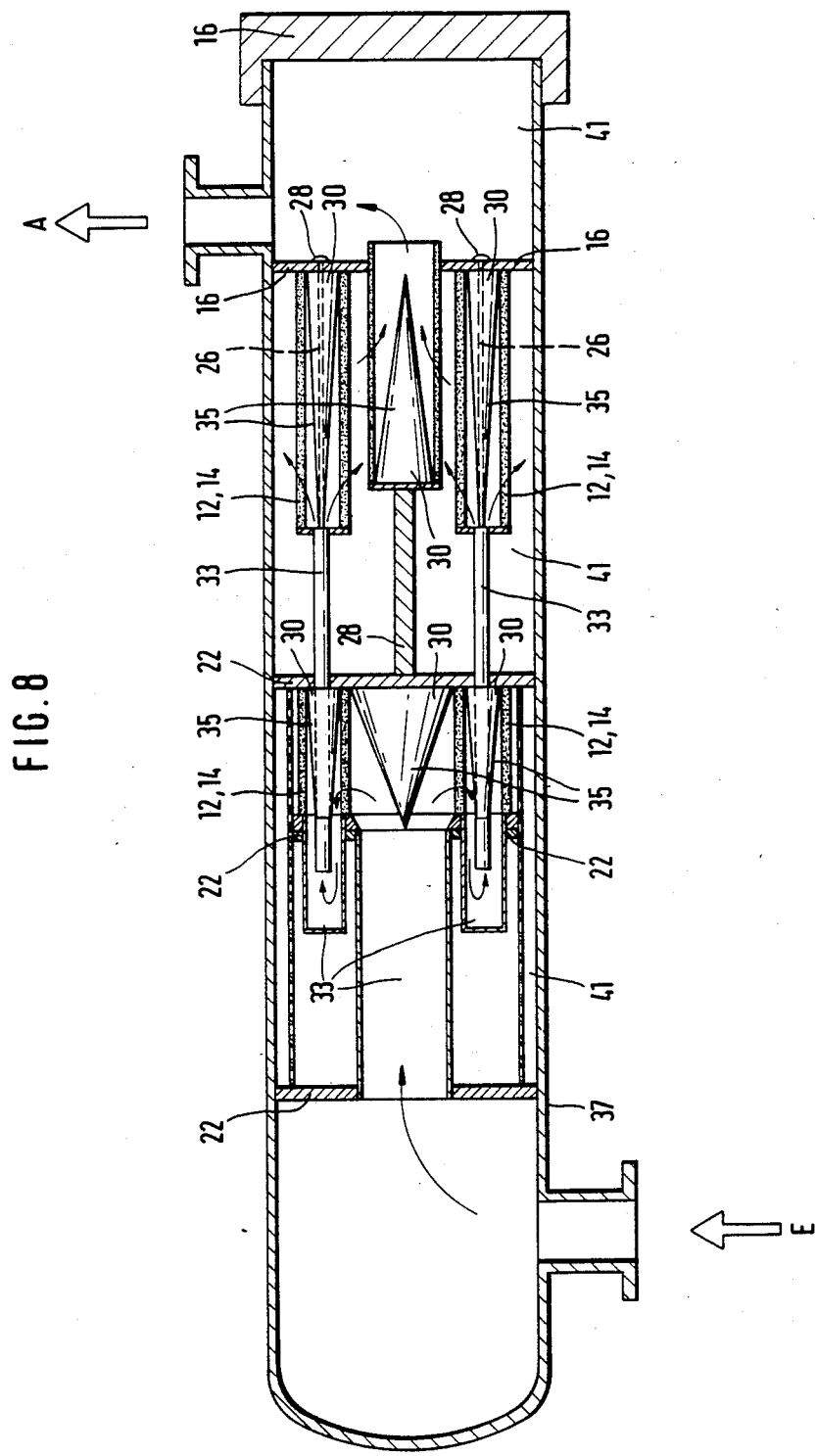

The invention will be explained with the aid of examples of embodiment illustrated in the drawings, wherein:

FIG. 1 is a longitudinal section through the separator apparatus,

FIG. 2 is a cross-section along the line 1—1 of FIG. 1, FIGS. 3, 4 and 5 each show a possible embodiment of the flow element, FIG. 6 is a combination of prefilter, coalescer and separator in the embodiment according to the invention, FIG. 7 shows a schematic embodiment of a filter water separator in longitudinal section and FIG. 8 shows a schematic embodiment of a plurality of filter elements arranged parallel and in series with each other in a separator housing.

In FIG. 1 the apparatus for separating contaminants is denoted by the reference numeral 10. In FIG. 1 in the upper half of the drawing the flow of the filter body from the outside to the inside is illustrated and shown by the arrows drawn in full lines. In the lower half of the drawing the flow through the filter body from the inside to the outside is indicated, the arrows showing the direction being drawn in dashed lines. The apparatus housing has been omitted.

The apparatus comprises essentially a tubular filter body 12 having preferably a circular cross-section. The filter layer 14 consists of a fluid-permeable filter material. The one side of the filter body 12 is impermeably and fixedly closed by a cover 16. From the fluid mechanics point of view the inner flow space 18 is connected through the filter layer 14 to the outer flow space 20 surrounding the filter body 12.

Arranged at the end of the filter body 12 opposite the cover 16 is a plate 22 belonging to the housing and leaving free an inlet and outlet E,A from and to the inner flow space 18. The inlet or outlet E,A of the plate or manifold 22 is bridged by a bridge or hub 24.

The bridge or hub 24 is connected to the cover 16 by a spindle 26, the spindle 26 being secured by a securing means 28, preferably a nut.

Arranged round the spindle 26 is the flow element 30 which preferably has a basic form similar to a cone and a circular cross-section. The cross-section of the flow element is largest at the fixedly sealed side of the filter body 12 and tapers continuously towards the inlet or outlet side E,A of the filter body, reaching its smallest diameter at the end of the filter body 12.

The flow element 30 preferably extends directly from the plate 16, where the largest diameter of the cone is, up to the termination of the filter layer 14 at the end of the filter body 12, where the smallest diameter of the cone is.

The flow element 30 is preferably a conical body of a metallic material or a plastic, such as polypropylene or the like.

FIG. 2 is a schematic cross-section of the apparatus for separating contaminants.

Figure 3:
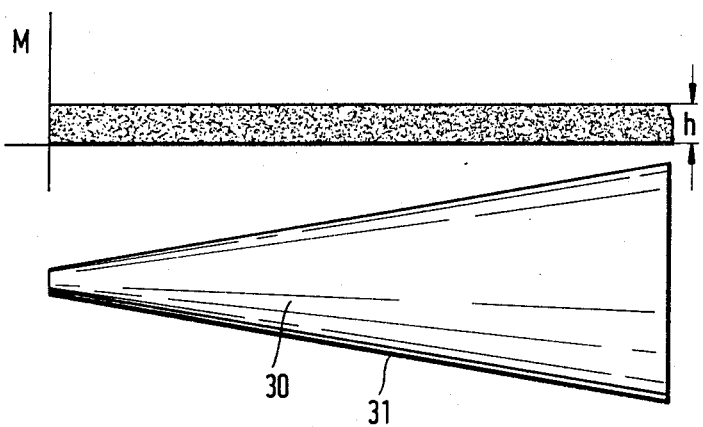

FIG. 3 shows the flow element in its simplest conical form, the generatrix 31 being a straight line. Also possible is an embodiment of the flow element which is likewise conical but with inwardly arched, i.e. concave, generatrix 31 corresponding to FIG. 4. In contrast, in accordance with FIG. 5 the flow element 30 can also have a convex form, i.e. the generatrix 31 is slightly outwardly arched.

In FIG. 3 over the conical form of the flow element 30 the throughput M in l/min is schematically illustrated over the entire length h of the flow element 30. Due to the straight generatrix 31 in FIG. 3 the throughput M is also constant over the entire length h of the flow element 30.

In the embodiments shown in FIGS. 4 and 5 as a whole the throughput amount M remains .the same compared with the embodiments shown in FIG. 3. The specific area throughput can however differ slightly from the area throughput in the embodiment of FIG. 3 in dependence upon the length l and the form of the flow element.

However, on the whole these are only slight deviations (of at the most 10% of the fluid amount pumped through).

If necessary, by correction or changing the conical form, i.e. with convex or concave generatrix, any irregular subjection of the filter to flow medium can be prevented. Thus, the flow element 30 is a universal regulator for the synchronous throughput velocity over the entire filter body with synchronous flow velocity in the interior.

The construction of the flow element 30 as conical form and in contrast therewith the constant inner diameter of the filter body make it possible to keep the flow velocity and the fluid throughput constant throughout the entire inner flow space. A necessary result of this is a flow subjection over the entire filter element which is of equal magnitude over the entire area as is the essential requirement for optimum and reliable efficacy in all operating phases occurring in practice, for example with changing volume flows or pulsating operation.

The flow element 30 can also be subsequently installed in the corresponding filter elements in equipment which is already in operation.

FIG. 6 shows in simplified manner a combination of the apparatus according to the invention with prefilter 32, coalescer 34 and separator 36. The prefilter 32 is fixedly sealed at the side of the flow element of greatest cross-section by the cover 16. The fluid containing foreign bodies flows from the outer flow space via the filter layer 14 into the inner flow space 18. The prefiltered fluid is conducted by the generatrix 31 of the flow element 30 through the opening of the plate 22 into the inner flow space 18 of the coalescer 34. The flow there is from the inside to the outside, i.e. from the inner flow space through the filter layer 14 into the outer flow space 20. The coalescer 34 and separator 36 are connected together at their respective ends of greatest cross-sectional area of the flow element 30 by a further cover 16. The fluid to be cleaned is now constrained to pass via the outer flow space 20 through the filter layer 14 to the inner flow space 18 of the separator 36 and due to the conical flow element supplied to the output of the plate 22.

With regard to the illustration in FIG. 7 express attention is drawn to FIG. 1 and the associated description in the example of embodiment of DE-PS No. 3,440,506 and consequently the following description will contain only the most essential matter.

Thus, FIG. 7 illustrates a corresponding filter water separator 10 according to the German patent in which in accordance with the present invention a flow element 30 has additionally been inserted. Said filter water separator 10 comprises a housing 37. The latter is upwardly open and can be closed with the aid of the cover 16. The housing 37 also has an inlet E and arranged therebelow an outlet A, the longitudinal axes of which are perpendicular to the housing longitudinal axis, the outlet A being curved within the housing 37.

Arranged in the housing 37 of the filter water separator 10 is a coalescer element 34 known per se, the upper side of which is closed by the plate 16. Thus, between the inner surface of the housing 37 an outer flow space 20 extends which is connected to the inlet E, i.e. forms a supply space for the fluid to be treated.

In the interior of the coalescer element 24, which forms the centre flow space 40, there is a guard and guide grating 38 along which the inner surface of the coalescer element 34 is led.

The second element stage is also provided coaxially with the longitudinal axis of the coalescer element 34, said element stage being the separator element 36 whose lower end opens into the outlet A.

The outer diameter of the likewise hollow cylindrical separator element 36 is less than the inner diameter of the coalescer element 34 so that between the two the centre flow space 40 is formed which communicates with the fluid collecting space 41 formed at the bottom in the housing 37.

The separator 36 is closed at its upper side with a centering plate 42. Led through the centering plate 42 and the plate 16 is a spindle 26 which extends therethrough and through the inner flow space 18 of the separator element 36 into the outlet A. The end of the spindle 26 is secured in a hub 24 which is connected to the outlet A. A spacer ring 44 is so arranged with respect to the adjoining annular space 43 that the separator element 36 is downwardly displaced with respect to the coalescer element 34.

Furthermore, the housing 37 comprises on its inner surface in the region of the inlet E a baffle plate 46 with which the inflowing fluid is directed to one side and upwardly and downwardly.

Mounted on the spindle 26 in the inner flow space 18 is the flow element 30 according to the invention and in this case as well the largest diameter of the cone is disposed in the region of the closed side of the filter water separator 10, i.e. in the region of the centering plate 42, and the smallest diameter is disposed before the start of the outlet curvature at the lower end of the coalescer element 34 or separator element 36.

The mode of operation is as described in DE-PS No. 3,440,506. However, there is an almost uniform throughput of the flow medium through the separator element 36 into the inner flow space 18 on the basis of the conditions described in FIG. 1.

According to FIG. 8 in a single separator housing 37 a predetermined number of filter elements 35 are arranged parallel and in series with each other. One filter element lies in another filter element and a futher filter element also in another filter element but the second group of filter elements is disposed behind the first group. All these filter elements are in flow communication; the filter body 12 or the filter layer 14 of a filter element 35 of one group simultaneously forms the filter body 12 or the filter layer 14 of the adjacent filter element 35 of the same group. The filter elements 35 of the first group are separated by a plate or manifold 22 from the filter elements 35 of the second group but are connected by corresponding feed means 33 to said second group. The fluid to be treated flows via the inlet E into the interior of the separator housing 37.

Thereafter it passes through a feed means 33 into the filter chamber which is separated from the entrance space by a plate or manifold 22. The fluid passes through the filter element 35 disposed on the centre and is thereby conducted outwardly by the flow element 30. The fluid passes through the filter layer 14 of the filter body 12, enters the outer filter element 35 and is conducted by the flow element 30 of the latter to the feed means 33 which leads through a further plate or manifold 22. Said plate 22 separates the first group of the filter elements 35 from the second group of the filter elements 35 behind the first group. The outer filter element 35 of the first group is likewise separated by a plate 22 from the inner filter element 35 at which the flow arrives first to prevent the fluid from flowing back to the inner filter element 35 after passing the outer filter element 35.

The fluid is thus conducted by means of feed means 33 to the outer filter element 35 of the second group and is conducted by the flow element 30 thereof into the space surrounding the inner filter element 35 through the filter layer 14 of the filter body 12. The flow element 30 of the inner filter element 35 conducts the fluid via an outlet space to the outlet A. The remaining portion of the outlet space is separated from the filter space by a cover 16, which can also be constructed as plate. The outer filter element 35 of the second group is secured by suitable securing means 28 to said cover 16. The inner filter element 35 of the second group is held on the one hand by another securing means 28 and on the other hand in the cover 16. Said securing means 28 terminates at the plate 22 which separates the first group from the second group of filter elements 35. 41 denotes in each case the fluid collecting spaces which receive the separated fluid. The end of the housing 35 is closed at its outlet side by a cover 16.

I claim:

1. An apparatus for separating contaminants comprising:
    a plurality of filter elements with each element including a tubular filter body having an inner flow space which is separated by a filter layer, the filter layer presenting respective opposed sides, from an outer flow space, the filter body presenting respective, opposed, open and closed ends, and the inner flow space of said filter body having a flow element disposed away from the open and towards the opposed end of the filter body for continuous narrowing of the inner flow space and being in flow contact through the filter layer with the outer flow space on the one filter layer side and through the open end on the opposed filter layer side,
    the filter elements being arranged in at least two series-connected groups with a plurality of filter elements in each group and arranged in a series and with the filter body of the filter layer of a filter element in one of the groups simultaneously forming the filter body, respectively the filter layer of the adjacent filter element of the one group being in flow contact with a filter element of the other group.

2. An apparatus according to claim 1, the filter elements in each group being arranged circularly about a centrally disposed filter element.

3. An apparatus according to claim 1 or 2 wherein the filter elements of the first group are separated by means of a plate or manifold from the filter elements of the second group with both groups having interconnected by means of a feed means.

4. An apparatus according to claim 1, the flow elements presented arcuately shaped generatrices.

5. An apparatus for separating contaminants from a fluid, said apparatus comprising:
    a separation housing having a fluid inlet and a fluid outlet;
    a plurality of filter elements located within the housing,
    each of said filter elements including—
        a tubular body having a filter layer, said filter body defining an inner flow space and an outer flow space with said filter layer therebetween, and presenting a closed end and an open end, and
    a flow element within the said inner flow space and presenting a first and located adjacent said closed end and a second end located adjacent said open end, said flow element presenting a surface gradually narrowing from said first end toward said second end,
    said filter elements making up a plurality of groups with each of said groups including at least one of said flow elements; and
    means coupling said groups in a series fluid flow relationship between said inlet and outlet thereby ensuring substantially equal fluid flow through each of said groups.

6. The apparatus as set forth in claim 5, at least one of said groups including a multiplicity of filter elements and means coupling said multiplicity of filter elements in a configuration wherein said filter layer of at least one of the filter elements of said multiplicity also forms at least a portion of said filter layer of an adjacent filter element included in said multiplicity.

7. The apparatus as set forth in claim 6, some of said multiplicity of filter elements being arranged in a circular pattern about a centrally located filter element with a portion of the filter layer of each of the circularly arranged filter elements forming the filter layer of said centrally located filter element.

8. The apparatus as set forth in claim 7, said circularly arranged filter elements being coupled in a parallel fluid flow arrangement with respect to one another and being coupled in a series fluid flow relationship with respect to said centrally located filter element.

9. The apparatus as set forth in claim 5, the flow elements making up each group presenting an effective total flow capacity, said effective flow capacity of each of said groups being substantially equal.

* * * * *